D. W. RICHARDSON.
FRUIT PICKING GLOVE.
APPLICATION FILED APR. 20, 1910.
969,119.
Patented Aug. 30, 1910.
2 SHEETS—SHEET 1.
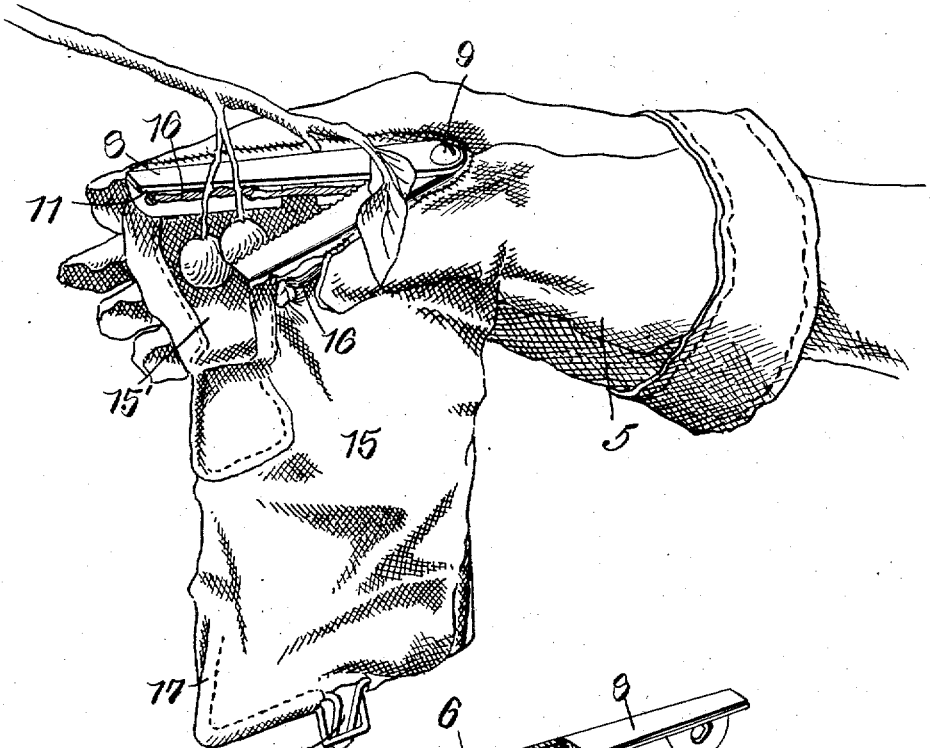
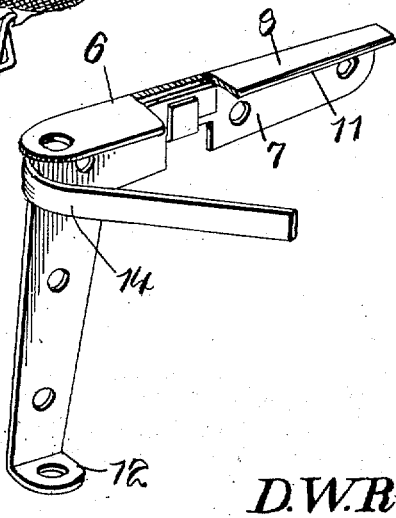
Witnesses
Chas. L. Grieshauer.
E. M. Ricketts
Inventor
D. W. Richardson
By Watson E. Coleman
Attorney

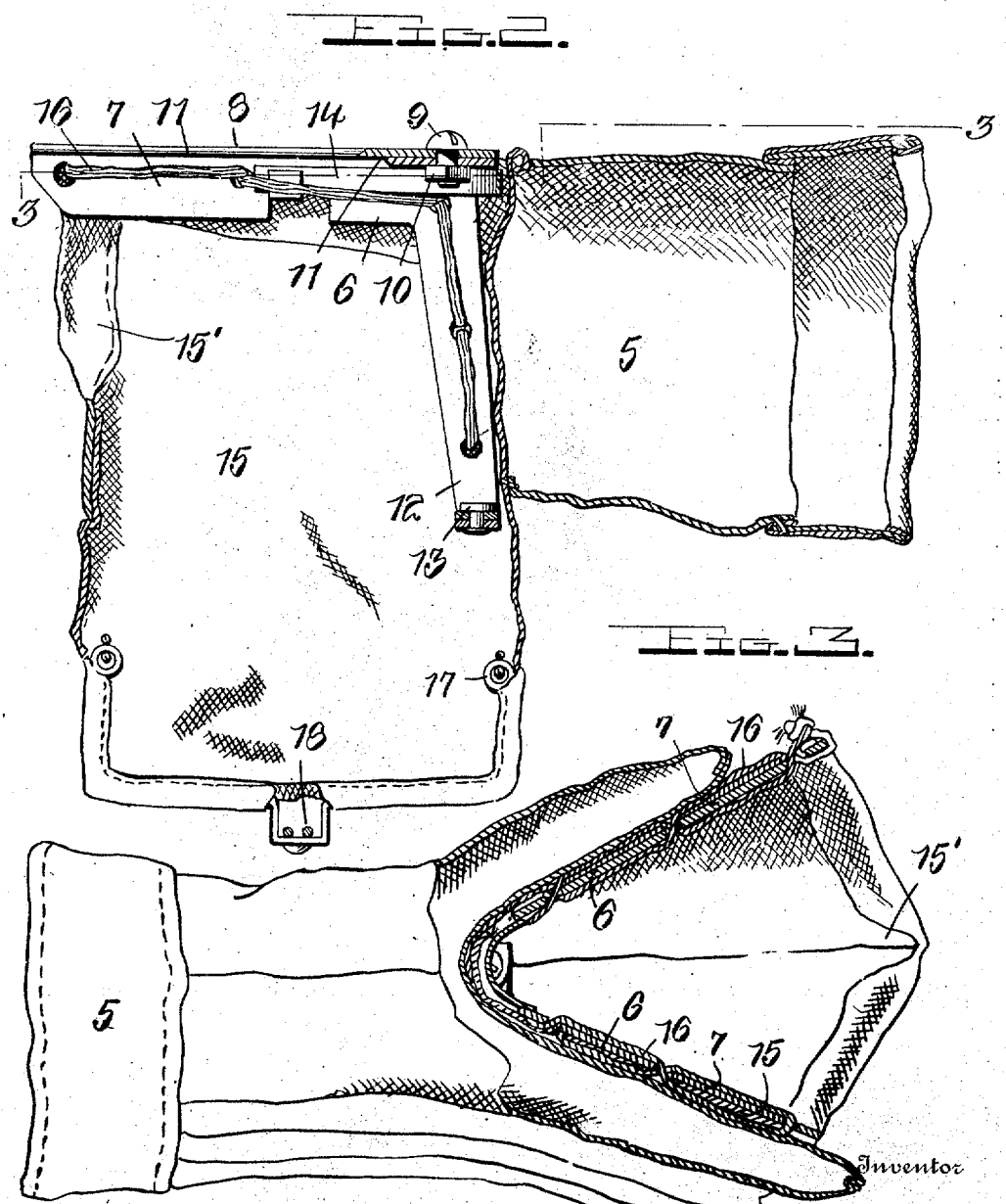

UNITED STATES PATENT OFFICE.

DANIEL W. RICHARDSON, OF SOUTH FRANKFORT, MICHIGAN.

FRUIT-PICKING GLOVE.

969,119.  Specification of Letters Patent.  Patented Aug. 30, 1910.

Application filed April 20, 1910. Serial No. 556,502.

*To all whom it may concern:*

Be it known that I, DANIEL W. RICHARDSON, a citizen of the United States, residing at South Frankfort, in the county of Benzie and State of Michigan, have invented certain new and useful Improvements in Fruit-Picking Gloves, of which the following is a specification, reference being had to the accompanying drawings.

This invention relates to improvements in fruit clippers and more particularly to a device of this character which is primarily adapted for clipping cherries, berries or other stemmed fruit, and has for its object to simplify and improve the construction of such clippers or shears so that they may be readily operated by one hand and the fruit deposited into a suitable receptacle carried by the clippers.

Another object is to provide a fruit clipping device secured between the thumb and first finger stalls of a glove, said clippers having laced or otherwise secured thereto a depending sack or pouch into which the cherries or other fruit are dropped after the stems are severed.

A still further object resides in the provision of a clipping device of the above character whereby a large quantity of fruit may be quickly gathered, said device being of such construction that the necessity of providing a separate receptacle for the fruit is eliminated.

With these and other objects in view, the invention consists of the novel features of construction, combination and arrangement of parts hereinafter fully described and claimed, and illustrated in the accompanying drawings, in which—

Figure 1 is a perspective view illustrating the application of my invention; Fig. 2 is a vertical section through the clipper; Fig. 3 is a section taken on the line 3—3 of Fig. 2; and Fig. 4 is a detail perspective view of one of the clipping members.

Referring more particularly to the drawings 5 indicates a glove which is preferably formed of canvas or other suitable material which individual taste may desire.

My improved clipper is adapted to be secured between the thumb and first finger of the glove and comprises two similar clipping members 6 each of which is in the form of an angular metal plate 7, preferably steel. One of the arms of each of these plates is adapted to be arranged between the thumb and first finger of the glove, and is formed with a transversely extending flange 8 upon one of its longitudinal edges. These flanges of the members 6 are pivoted together by means of a pin 9 which has a nut 10 threaded upon one end thereof for engagement with the under side of the flanges 8. These flanges gradually taper from their pivoted to their outer ends and have their opposed longitudinal edges sharpened as shown at 11. The other arms of the members 6 have their extremities angularly disposed as shown at 12 and connected by a pivot stud 13. The cutting members are thus secured together so that when pressure is brought to bear upon the flanged arms thereof, the cutting edges of the flanges will move inwardly toward each other and sever the fruit stems from the branch.

A leaf spring 14 has its ends secured to the member 7 beneath the flanges 8 thereof, the intermediate portion of said spring being curved or rounded between the cutting members. While this spring may be secured at its ends in any desired manner, I preferably bend up a portion of the arms of the members 6 and clench the same upon the ends of the spring. This spring has sufficient strength to quickly separate the cutting edges of the flanges 8 when pressure upon the arms is released.

In order to provide a suitable receptacle to receive the cut fruit, I provide a cloth sack or pouch 15 which is secured to the members 6 by means of the lacing strings 16. This spring is passed through a plurality of openings in the arms of the clipping members and suitably secured and tied or knotted at its ends to prevent the same from accidentally becoming unlaced. The upper end of the front edge of the pouch or sack 15 is open as shown at 15' so as to form a mouth to receive the fruit after the same is clipped by the cutting members. The lower end of the bag 15 is provided with the hinged frame members 17, formed of wire and looped upon themselves intermediate of their ends as shown at 18. One of these loops is slightly longer than the other and is adapted to be disposed therethrough to securely close the bottom of the bag. When the bag or sack becomes filled with fruit, it may be readily emptied by forcing the loops apart to permit of the opening of the wire frames. The bag is sewed at its upper edge to the thumb and first finger of the glove 5.

In the use of my improved clipping device, the glove is arranged upon the hand in the usual manner, and the operator positions the cutting edges of the flanges 8 upon opposite sides of the fruit stems. He then exerts sufficient pressure upon the horizontal arms of said members to cause the same to close whereby the stems are quickly severed. Upon the release of the pressure the spring 14 quickly returns the cutting blades to their normal positions for another operation. In this manner it will be obvious that a great quantity of fruit may be very quickly picked, and as the bag or sack 15 may be made of sufficient capacity to hold a large quantity of fruit, the operator will thus be allowed to continue the picking of the fruit for a considerable length of time before emptying the bag.

Upon reference to Fig. 1 of the drawings it will be noted that one of the cutting blades of the shears is serrated upon its inner longitudinal edge. Thus instead of making a shear cut of the front stems when the blades are closed, the stems are broken or pinched to leave a blunt end and prevent the ends of the stems from puncturing the other fruit.

From the foregoing it is believed that the construction and operation of my improved clipper will be readily understood.

The device is simple, inexpensive to manufacture and is highly efficient and durable in operation.

While I have particularly shown and described the preferred embodiment of the invention it will be obvious that numerous minor modifications may be resorted to without materially departing from the essential features or sacrificing any of the advantages thereof.

Having thus described the invention what is claimed is:—

1. In a device of the character described, the combination with a glove, of two members having arms extending at an angle to each other disposed between the thumb and forefinger of the glove, a cutting blade formed on one arm of each of said members, said blades being pivotally connected at one end, the extremity of the other arm of each member being flanged and pivotally connected together, a fruit receiving pouch secured to said members and sewed to the glove, said last named arms extending into said pouch, and a spring secured to said members and adapted to yieldingly hold the cutting blades thereof in spaced divergent relation to each other.

2. In a device of the character described, the combination with a glove, of two members having arms extending at an angle to each other arranged between the thumb and forefinger of said glove, a transversely disposed cutting blade formed on one arm of each member, a pivot pin connecting said blades at their inner ends, a pouch sewed to the thumb and forefinger of the glove, the other arms of said members extending into said pouch, a pivot pin connecting the ends of said arms, each of the arms of said members being provided with a plurality of apertures, a single lacing string extending through said apertures and the pouch to secure the pouch to said members, and a bowed spring extending between and secured to the first named arms of the members to normally dispose the cutting blades in spaced divergent relation and to open the mouth of the pouch.

In testimony whereof I hereunto affix my signature in the presence of two witnesses.

DANIEL W. RICHARDSON.

Witnesses:
J. F. HOFSTETTER,
LOTTIE STALL.